US008217750B2

(12) United States Patent
Machida

(10) Patent No.: US 8,217,750 B2
(45) Date of Patent: Jul. 10, 2012

(54) 3-ELECTRODE SURGE PROTECTIVE DEVICE

(75) Inventor: Kazuhiko Machida, Nagano (JP)

(73) Assignee: Shinko Electric Industries Co., Ltd., Nagano-shi (JP)

(*) Notice: Subject to any disclaimer, the term of this patent is extended or adjusted under 35 U.S.C. 154(b) by 243 days.

(21) Appl. No.: 12/722,905

(22) Filed: Mar. 12, 2010

(65) Prior Publication Data

US 2010/0231346 A1 Sep. 16, 2010

(30) Foreign Application Priority Data

Mar. 13, 2009 (JP) ................................ 2009-060440

(51) Int. Cl.
*H01H 85/04* (2006.01)
*H02H 1/00* (2006.01)
*H02H 9/04* (2006.01)

(52) U.S. Cl. ....... 337/32; 337/1; 337/5; 337/6; 337/405; 337/406; 337/28; 337/31; 361/118; 361/119; 338/21; 338/22 R; 338/24

(58) Field of Classification Search .................... 29/619; 337/1, 5, 6, 405, 406, 28, 31, 32; 338/21, 338/22 R, 24; 361/118, 119; 379/412
See application file for complete search history.

(56) References Cited

U.S. PATENT DOCUMENTS 3,638,083 A * 1/1972 Dornfeld et al. ........... 361/321.1
3,903,494 A * 9/1975 May ................................ 338/20
4,086,648 A * 4/1978 Hines et al. ................... 361/124
4,107,759 A * 8/1978 Shirn et al. ................. 361/275.4
4,107,762 A * 8/1978 Shirn et al. ..................... 361/534
4,161,762 A * 7/1979 Scheithauer .................. 361/124
4,188,561 A * 2/1980 Pranke et al. ................. 313/325
4,212,045 A * 7/1980 Martzloff ...................... 361/127
4,288,833 A * 9/1981 Howell ......................... 361/124
4,314,304 A * 2/1982 Baumbach ..................... 361/124
4,538,347 A * 9/1985 Palilla et al. ..................... 29/619
4,876,621 A * 10/1989 Rust et al. ........................ 361/58
4,910,489 A * 3/1990 Neuwirth et al. ............... 337/32
4,912,592 A * 3/1990 Flindall et al. ................ 361/120
4,975,674 A * 12/1990 Sumiyoshi et al. ............. 338/21
5,315,474 A * 5/1994 Kuriyama ..................... 361/534
(Continued)

FOREIGN PATENT DOCUMENTS

JP 2-070390 3/1990
(Continued)

*Primary Examiner* — Anatoly Vortman
(74) *Attorney, Agent, or Firm* — Rankin, Hill & Clark LLP

(57) ABSTRACT

The 3-electrode surge protective device includes: a surge protective device body including: an earth electrode; a ceramic cylinder; and a pair of line electrodes; and a fail-safe spring including: an elastic mount portion; and a short-circuit portion, a conductive material that is sandwiched between the fail-safe spring and the body; and a pair of first lead pins provided on the pair of line electrodes; a second lead pin provided on the earth electrode. In a normal state, the conductive material support the short-circuit portion at a separation position where the short-circuit portion is separated from the outer peripheral face of the body and the first lead pins. In case where the body is overheated and the conductive material is melted, the short-circuit portion is moved to a contact position where the short-circuit portion comes into contact with the second lead pin and the first lead pins.

16 Claims, 11 Drawing Sheets

U.S. PATENT DOCUMENTS 5,363,272 A * 11/1994 Tanaka et al. ................. 361/534
5,475,356 A * 12/1995 Kasahara ......................... 337/31
5,708,553 A * 1/1998 Hung ............................ 361/103
5,781,394 A * 7/1998 Lorenz et al. ................. 361/124
5,901,027 A * 5/1999 Ziegler et al. ................. 361/124
5,982,597 A * 11/1999 Webb ............................ 361/103
6,094,128 A * 7/2000 Bennett et al. .................. 338/21
6,204,746 B1 * 3/2001 Kane et al. ....................... 337/32
6,211,770 B1 * 4/2001 Coyle ............................. 338/21
6,252,488 B1 * 6/2001 Ziegler et al. ..................... 337/5
6,307,462 B2 * 10/2001 McLoughlin ................... 338/21
6,424,514 B1 * 7/2002 Boy et al. ...................... 361/119
6,430,019 B1 * 8/2002 Martenson et al. ........... 361/124
6,445,560 B1 * 9/2002 Bobert et al. ................. 361/120
6,636,403 B2 * 10/2003 McLoughlin et al. ........ 361/103
7,375,943 B2 * 5/2008 Lu ................................. 361/126
7,453,681 B2 * 11/2008 Ho ................................ 361/127
7,477,503 B2 * 1/2009 Aszmus ......................... 361/124
7,483,252 B2 * 1/2009 de Palma et al. .............. 361/127
2008/0129440 A1 * 6/2008 Ho .................................... 337/5
2009/0128978 A1 * 5/2009 Vo et al. ......................... 361/119
2010/0309598 A1 * 12/2010 Boy et al. ...................... 361/117
2011/0013335 A1 * 1/2011 Bobert .......................... 361/118

FOREIGN PATENT DOCUMENTS

JP 6-251852 9/1994
JP 6-251855 9/1994

* cited by examiner

3-ELECTRODE SURGE PROTECTIVE DEVICE

This application claims priority from Japanese Patent Application No. 2009-060440, filed on Mar. 13, 2009, the entire contents of which are herein incorporated by reference.

BACKGROUND OF THE INVENTION

Technical Field

The present disclosure relates to a 3-electrode surge protective device provided with a fail-safe mechanism.

3-electrode surge protective devices are used as components for avoiding surges caused by lightning which enters telephone lines. In order to avoid the surges infiltrating telephone lines using the 3-electrode surge protective device, the 3-electrode surge protective device discharges the surges entering the telephone lines from the outside, and surge current is allowed to flow toward the earth so that the surge current does not flow into devices. In the 3-electrode surge protective device, a phenomenon may occur in which the discharge of the surge protective device continues by the infiltrating surge from the outside and the discharge does not stop. A fail-safe mechanism of the surge protective device is provided to stop the discharge of the surge protective device and to prevent the surge protective device from overheating when the discharge of the surge protective device continues and does not stop.

As a fail-safe mechanism of a surge protective device, there is a mechanism in which a fail-safe spring is provided on an outer face of a main body of the surge protective device to cover a space between an earth electrode and a line electrode, and a solder chip is interposed between the fail-safe spring and the earth electrode. According to the fail-safe mechanism, the solder chip is melted when the surge protective device overheats, and the earth electrode and the line electrode are electrically short-circuited through the fail-safe spring. Thus, the discharge can be stopped. In addition, there is a mechanism in which an insulating film is interposed between the outer face of the line electrode and the inner face of fail-safe spring, and thus the fail-safe spring is mounted on the outer face of a main body of the surge protective device. In this case, when the discharge from the surge protective device continues and thus the surge protective device overheats, the insulating film is melted and the earth electrode and the line electrode are electrically short-circuited through the fail-safe spring thereby stopping the discharge (see e.g., JP-A-2-070390, JP-A-6-251852 and JP-A-6-251855).

In the 3-electrode surge protective device, one telephone line is connected to a pair of line electrodes. When lightning acts on the telephone line, generally, surge current, which has substantially the same magnitude, enters each of the line electrodes of the 3-electrode surge protective device in the same phase and the surge current can be avoided by the discharge from the surge protective device. However, recently, lightning frequently occurs by abnormal atmospheric phenomena, and thus phenomena have frequently occurred in which surge currents with different phases enter the telephone lines connected to the line electrodes of the 3-electrode surge protective device, and the magnitudes of the surge currents entering the line electrodes are different from one another.

When the surge currents with different phases enter the line electrodes, the surge currents flow only between one line electrode and the earth electrode. In this case, a phenomenon occurs in which the discharge from the surge protective device is occurred only on one side, and only one line electrode on the overheated side is short-circuited to the earth electrode by the fail-safe mechanism.

The surge protective device in which the line electrode and the earth electrode are electrically short-circuited by the operation of the fail-safe mechanism has to be replaced by a new one, but it is mechanically detected whether the surge protective device is faulty or not by detecting whether both telephone lines connected to the line electrodes have been both earthed. Accordingly, even when only one of the line electrodes has been earthed, which surge protective device is faulty cannot be detected and the surge protective device to be replaced cannot be detected.

For this reason, there is a demand for surge protective devices provided with a fail-safe mechanism in which a safety mechanism surely operates and easily detects a faulty surge protective device by setting the line electrodes to be earthed even when the surge currents with different phases seem to enter the line electrode.

SUMMARY OF THE INVENTION

Exemplary embodiments of the present invention address the above disadvantages and other disadvantages not described above.

Accordingly, it is an illustrative aspect of the present invention to provide a 3-electrode surge protective device provided with a fail-safe mechanism capable of short-circuiting both of the line electrodes and the earth electrode and stopping the discharge of the surge protective device by surely operating the fail-safe mechanism even when the phases or magnitudes of the surge currents infiltrating the line electrodes are different.

According to one or more illustrative aspects of the present invention, there is provided a 3-electrode surge protective device. The surge protective device includes: a surge protective device body including: an earth electrode; a ceramic cylinder bonded to the earth electrode; and a pair of line electrodes bonded to both side faces of the ceramic cylinder, and a fail-safe spring with an electrical conductivity that is mounted on an outer face of the surge protective device body, the fail-safe spring including: an elastic mount portion provided along an outer peripheral face of the earth electrode to push an outer peripheral face of the surge protective device body; and a short-circuit portion provided to intersect with the elastic mount portion and electrically connecting the earth electrode to the pair of line electrodes, a conductive material that is sandwiched between an inner face of the fail-safe spring and the outer face of the surge protective device body, the conductive material being provided at an intersecting position of the elastic mount portion and the short-circuit portion; and a pair of first lead pins provided on the pair of line electrodes; a second lead pin provided on the earth electrode. In a normal state, the conductive material serves as a spacer to support the short-circuit portion at a separation position where the short-circuit portion is separated from the outer peripheral face of the surge protective device body and the first lead pins. In case where the surge protective device body is overheated and the conductive material is melted, the short-circuit portion is moved to a contact position where the short-circuit portion comes into contact with the second lead pin and the first lead pins, by a pushing force of the elastic mount portion.

Other aspects and advantages of the present invention will be apparent from the following description, the drawings and the claims.

DETAILED DESCRIPTION OF EXEMPLARY EMBODIMENTS

[First Embodiment]

Hereinafter, a 3-electrode surge protective device according to exemplary embodiments of the invention will be described with reference to the drawings.

Figure 1:
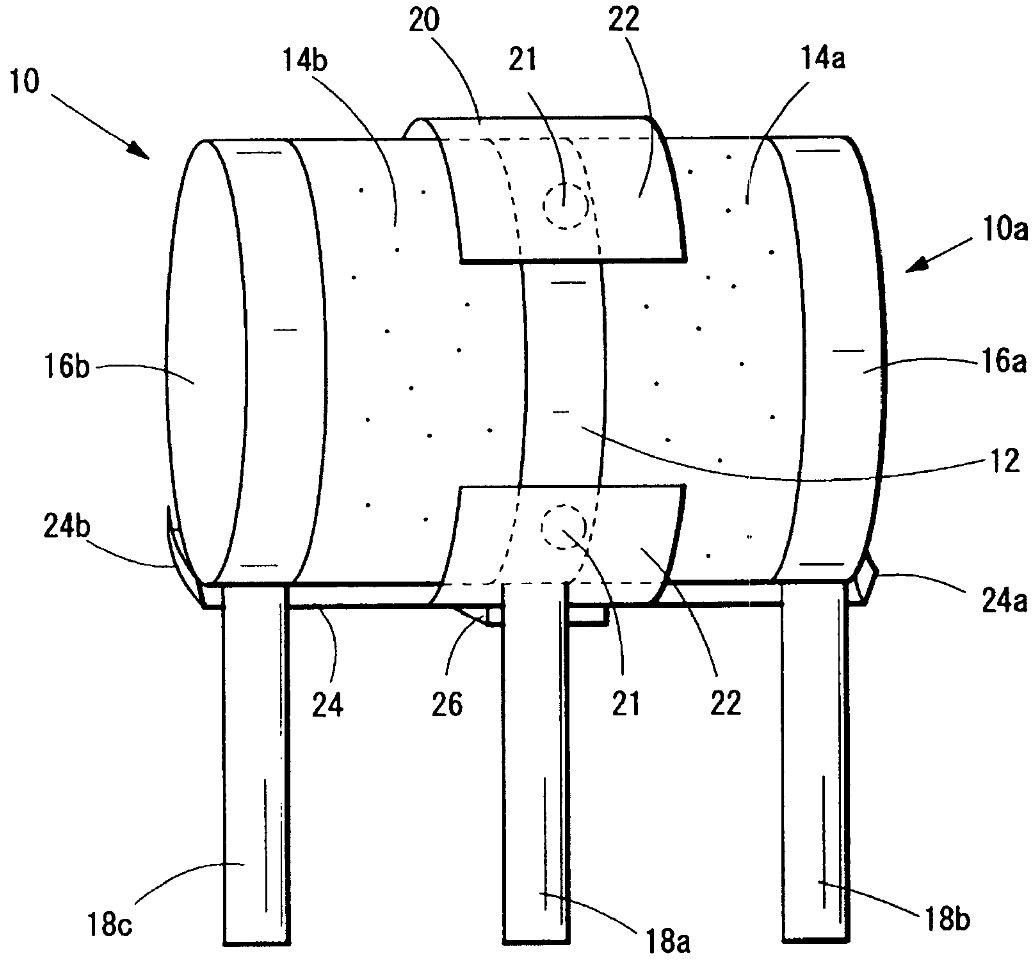
FIG. 1 is a perspective view of a 3-electrode surge protective device according to a first embodiment of the invention.

FIG. 1 is a perspective view illustrating a 3-electrode surge protective device provided with a fail-safe mechanism according to a first embodiment. A 3-electrode surge protective device 10 according to the embodiment is provided with an earth electrode 12, and a pair of line electrodes 16*a* and 16*b* provided through ceramic cylinders 14*a* and 14*b* on both sides of the earth electrode 12. Lead pins 18*a*, 18*b*, and 18*c* are provided on the outer faces of the earth electrode 12 and the line electrodes 16*a* and 16*b* by welding. The earth electrode 12, the ceramic cylinders 14*a* and 14*b*, and the line electrodes 16*a* and 16*b* constitute a surge protective device body 10*a*.

The 3-electrode surge protective device 10 according to the embodiment is provided with a fail-safe spring 20 mounted on the outer face of the surge protective device body 10*a* as the fail-safe mechanism. The fail-safe spring 20 is provided with an elastic mount portion 22 mounted on the other periphery of the earth electrode 12 of the surge protective device body 10*a*, and a short-circuit portion 24 is provided to electrically short-circuit the earth electrode 12 and the line electrode 16*a* and 16*b*. The elastic mount portion 22 is provided to hold the surge protective device body 10*a* therein, and the short-circuit portion 24 is provided in a direction perpendicular to the elastic mount portion 22.

Figure 2:
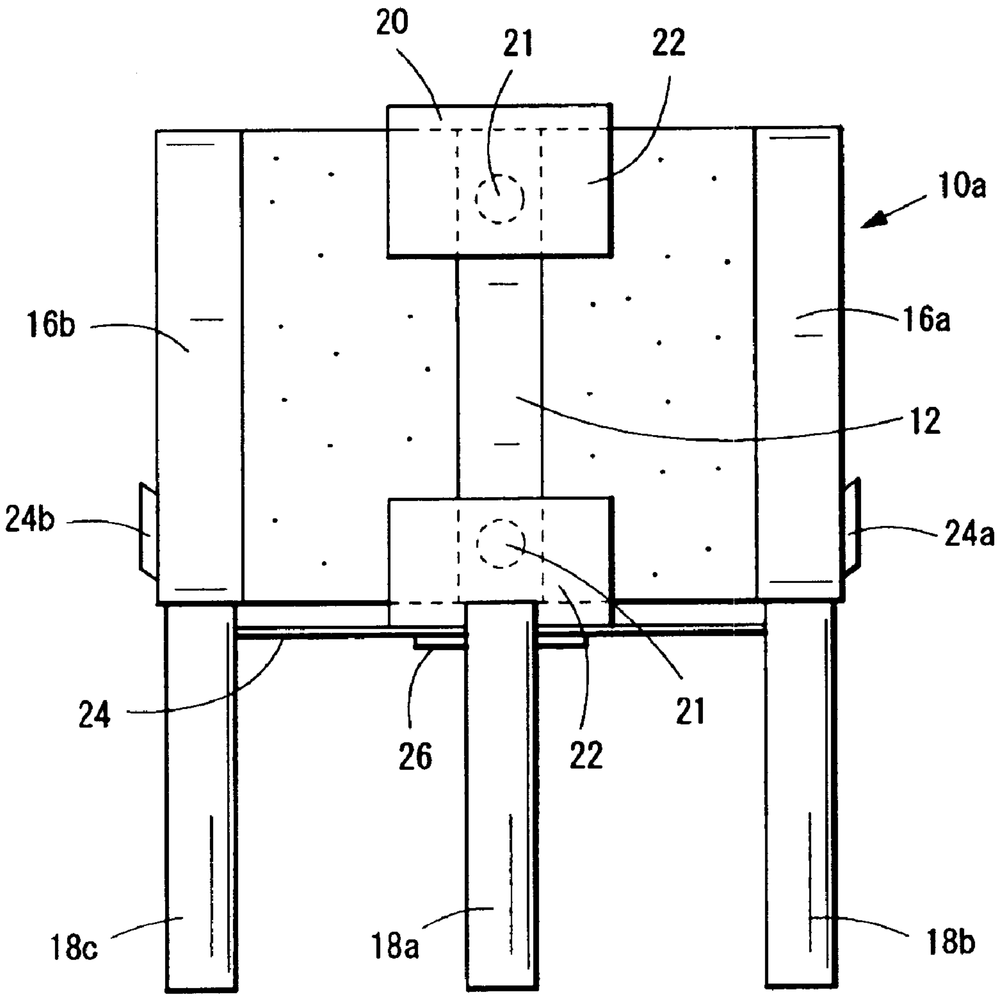
FIG. 2 is a front view of the 3-electrode surge protective device.

FIG. 2 is a front view of the 3-electrode surge protective device 10. The earth electrode 12, the line electrodes 16*a* and 16*b*, and the ceramic cylinders 14*a* and 14*b* are all formed with the same outer diameter, and the surge protective device body 10*a* has a cylindrical shape as a whole. The earth electrode 12 and the line electrode 16*a* and 16*b* are closely soldered to the end face of the ceramic cylinders 14*a* and 14*b*, and discharging gas is sealed in the surge protective device body 10*a*.

The lead pins 18*a*, 18*b*, and 18*c* are provided at the same circumferential positions on the outer faces of the earth electrode 12 and the line electrodes 16*a* and 16*b*, and the lead pins 18*a*, 18*b*, and 18*c* are arranged in a line (straight arrangement).

The elastic mount portion 22 of the fail-safe spring 20 is formed with a width larger than a thickness of the earth electrode 12, and both edges of the elastic mount portion 22 extend (but do not reach the line electrodes 16*a* and 16*b*) on the outer face of the ceramic cylinders 14*a* and 14*b* from the side edges of the earth electrode 12.

The both end portions of the elastic mount portion 22 are provided with a semispherical protrusion 21 protruding toward the outer face of the earth electrode 12.

Figure 3:
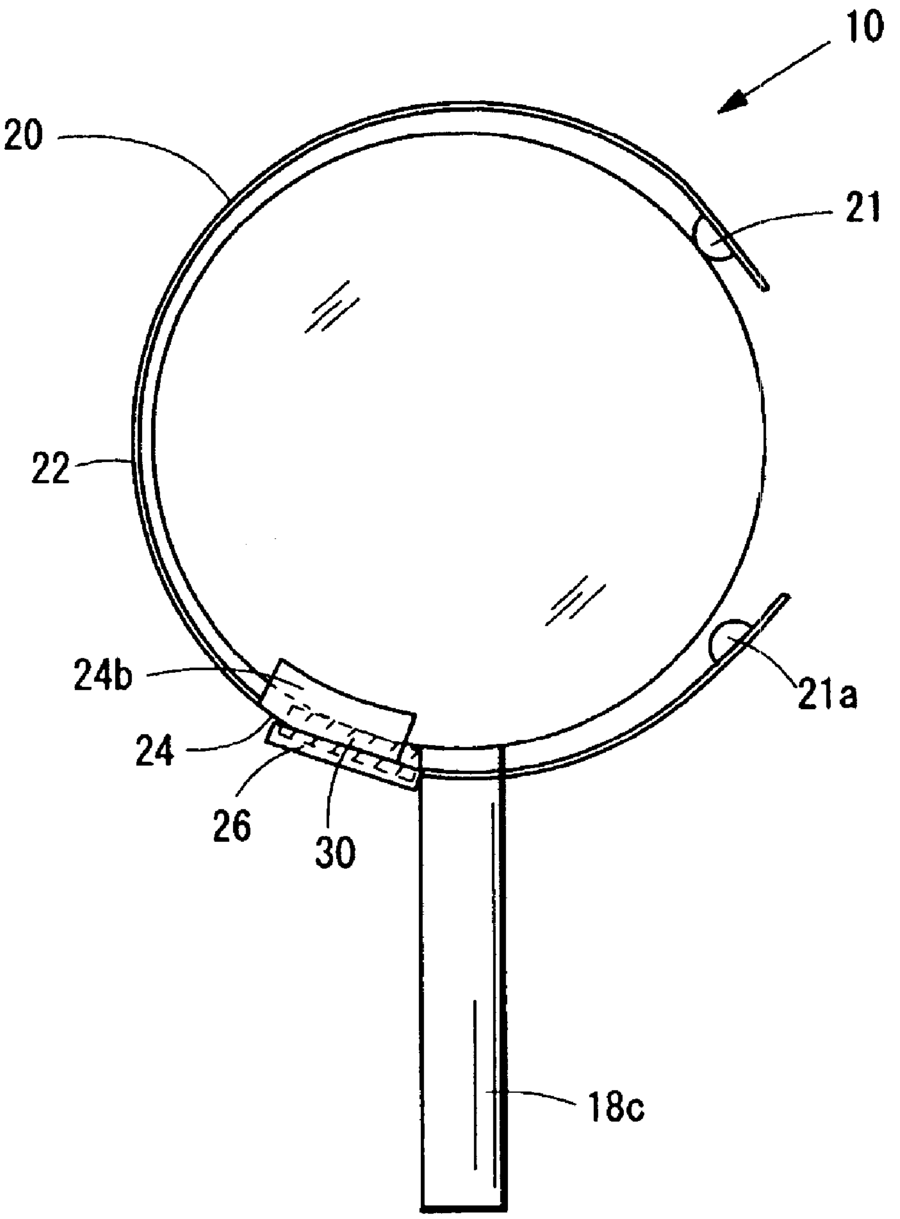
FIG. 3 is a side view of the 3-electrode surge protective device.

FIG. 3 shows a side view of the 3-electrode surge protective device 10.

The elastic mount portion 22 is provided to surround about ¾ of a circumference of the surge protective device body 10*a* in a state where the elastic mount portion 22 is mounted on the surge protective device body 10*a*.

A recess 26 for housing a solder chip therein is formed at an intersecting part of the elastic mount portion 22 of the fail-safe spring 20 and the short-circuit portion 24 such that a lower portion of the recess 26 slightly protrudes from the outer face of the fail-safe spring 20. The fail-safe spring 20 is mounted on the surge protective device body 10*a* with a solder chip 30 accommodated in the recess 26. FIGS. 1, 2, and 3 show a state where the fail-safe spring 20 is mounted on the surge protective device body 10*a* while the solder chip 30 is housed in the recess 26.

In the state where the solder chip 30 is housed in the recess 26 of the fail-safe spring 20, a depth of the recess 26 and a thickness of the solder chip 30 are set so that the surface of the solder chip 30 protrudes from the surface (face opposed to the body) of the fail-safe spring 20. The fail-safe spring 20 is mounted on the surge protective device body 10*a* such that the solder chip 30 is in contact with the outer face of the surge protective device body 10*a* (specifically, the outer faces of the earth electrode 12 and the ceramic cylinders 14*a* and 14*b*). That is, the solder chip 30 serves as a spacer for separating the fail-safe spring 20 from the outer face of the surge protective device body 10*a*.

FIG. 3 shows that the solder chip 30 serves as the spacer and the fail-safe spring 20 is mounted on and separated from the outer face of the body of the 3-electrode surge protective device 10.

As described above, at the leading end of the elastic mount portion 22, the protrusion 21 is provided at a position opposed to the outer peripheral face of the earth electrode 12. In the state where the fail-safe spring 20 is mounted on the body, the protrusion 21 is in contact with the outer face of the earth electrode 12, and the fail-safe spring 20 is supported to be separated from the outer face of the surge protective device body 10*a* except for the protrusion 21 by the spacer function of the solder chip 30. Actually, the protrusion 21 (close to the lead pins) close to the lower end of two protrusions 21 is slightly separated from the outer peripheral face of the earth electrode 12. The solder chip 30 is constantly pressed toward the outer face (the outer faces of the earth electrode 12 and the ceramic cylinders 14*a* and 14*b* close to the earth electrode 12) of the surge protective device body 10*a* by the elastic force of the elastic mount portion 22.

Figure 4:
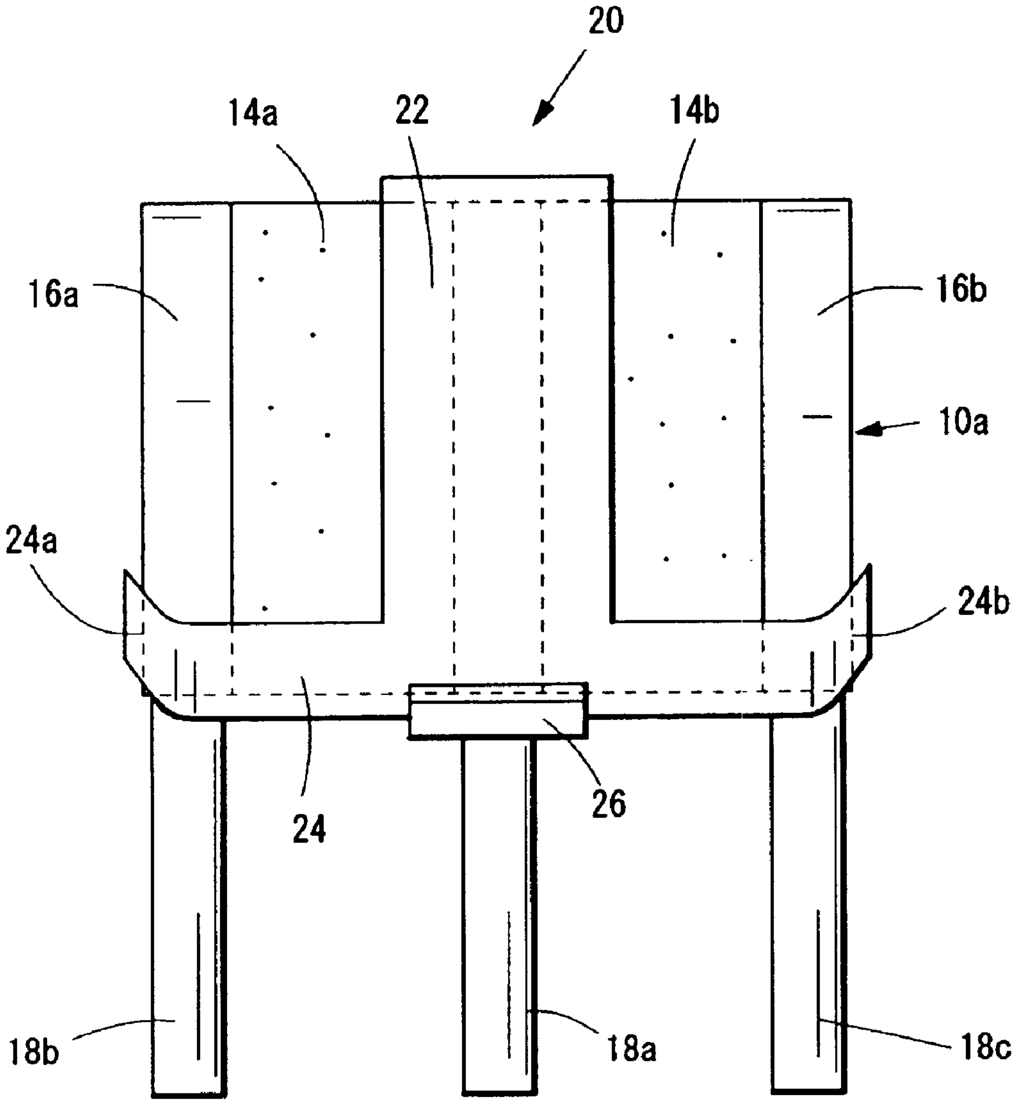
FIG. 4 is a rear view of the 3-electrode surge protective device.

FIG. 4 shows a rear view of the 3-electrode surge protective device 10.

The elastic mount portion 22 of the fail-safe spring 20 is mounted at the center of the surge protective device body 10*a* so as to hold the surge protective device body 10*a*, and the short-circuit portion 24 is provided to intersect with the elastic mount portion 22. The short-circuit portion 24 is provided near the base end portions of the lead pins 18*a*, 18*b*, and 18*c* provided on the earth electrode 12 and the line electrodes 16*a* and 16*b*.

As shown in FIG. 4, the short-circuit portion 24 extends sideward from the position intersecting with the elastic mount portion 22, and the extending ends are provided over the parts where the line electrodes 16*a* and 16*b* are provided. Bending portions 24*a* and 24*b* are provided at both ends of the short-circuit portion 24 to be bent in a direction approaching the outer faces of the line electrodes 16*a* and 16*b*. The bending portions 24*a* and 24*b* are curved in a curved face shape according to the outer edges of the line electrodes 16*a* and 16*b*. A part of the short-circuit portion 24 opposed to the outer face of the surge protective device body 10*a* is curved according to the curved face of the outer face of the surge protective device body 10*a*.

Figure 5:
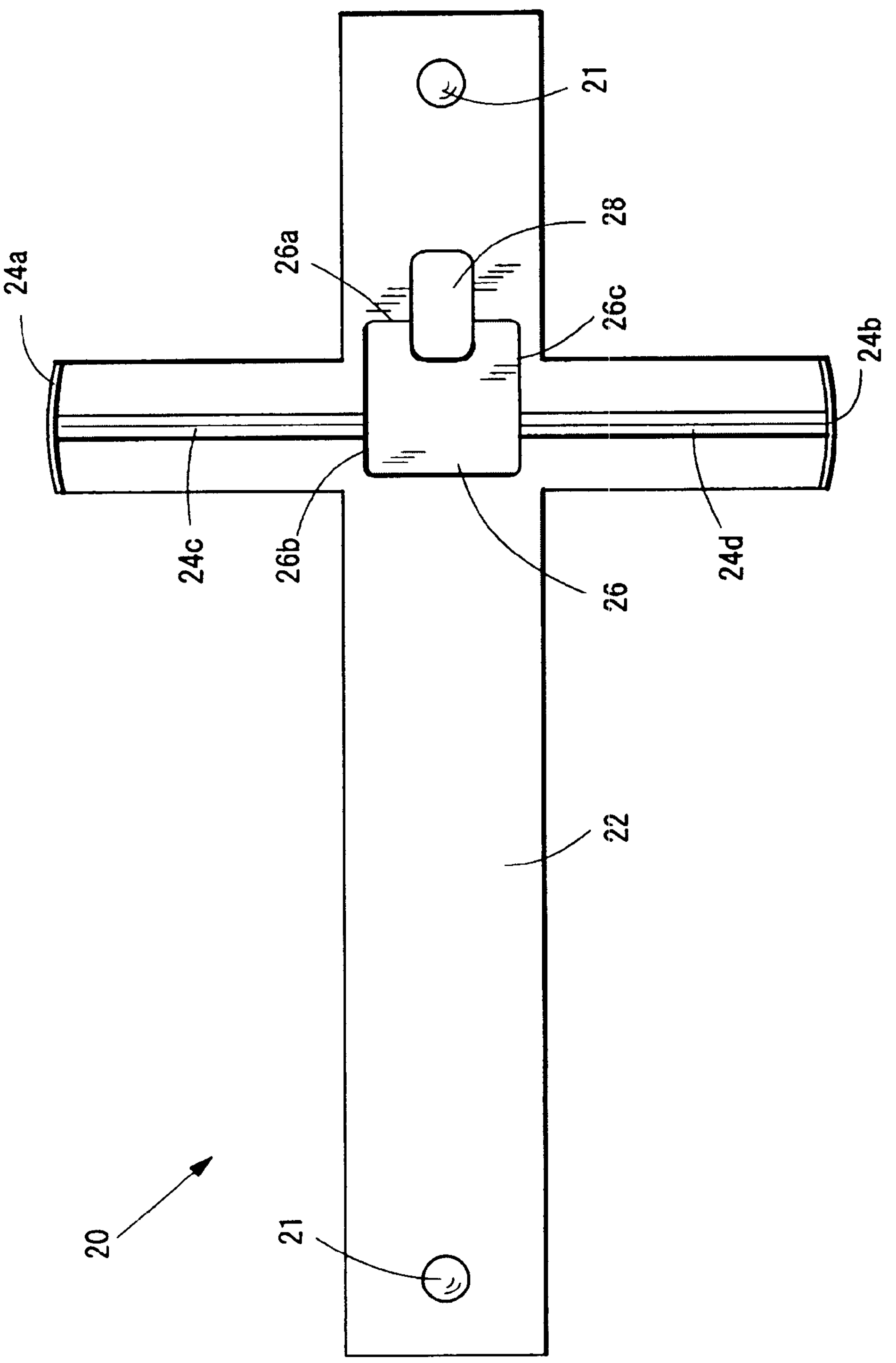
FIG. 5 is a development view of a fail-safe spring.

FIG. 5 shows a plan development view of the fail-safe spring 20.

As described above, the fail-safe spring 20 includes the elastic mount portion 22 and the short-circuit portion 24. The short-circuit portion 24 is provided at a position deviating from the longitudinal center of the elastic mount portion 22 so as to intersect in a direction perpendicular to the longitudinal direction of the elastic mount portion 22. The protrusions 21 are provided in the vicinity of both ends of the elastic mount portion 22. The bending portions 24*a* and 24*b* are provided at both ends of the short-circuit portion 24.

The recess 26 for housing the solder chip 30 therein is formed at the intersecting position of the elastic mount portion 22 and the short-circuit portion 24. In the embodiment, the solder chip 30 which is rectangular in the plan view is used. For this reason, the recess 26 is formed in a rectangular shape according to the plan shape of the solder chip 30.

The recess 26 surely interposes the solder chip 30 between the outer face of the surge protective device body 10*a* and the fail-safe spring 20 by accommodating the solder chip 30 in the recess 26, and operates to mount the fail-safe spring 20. The recess 26 is formed with a depth smaller than a thickness of the solder chip 30.

The elastic mount portion 22 is provided with a hole 28 allowing the lead pin 18*a* to pass therethrough at a position intersecting with a side portion 26*a* of the recess 26 opposed to the short side of the elastic mount portion 22. The hole 28 is formed of a longitudinal hole which is longitudinally parallel to a longitudinal direction of the elastic mount portion 22. In the hole 28, the lead pin 18*a* can move in the longitudinal direction of the hole 28. The solder chip 30 which is formed in rectangular shape in the plan view is housed in the recess 26. The hole 28 is provided so that one longitudinal end side thereof enters the area where the solder chip 30 is housed.

The inner face of the short-circuit portion 24 opposed to the outer face of the surge protective device body 10*a* is provided with grooves 24*c* and 24*d* formed to contact with the side portions 26*b* and 26*c* (flat area of the recess 26) of the recess 26 opposed to the short-circuit portion 24. One end side of each of the grooves 24*c* and 24*d* is provided to contact with the side portions 26*b* and 26*c*, respectively, of the recess 26 in parallel to the longitudinal direction of the short-circuit portion 24, and the other end side of each of the grooves 24*a* and 24*d* is provided to extend to the respective end portions (position where the bending portions 24*a* and 24*b* are provided) of the short-circuit portion 24. In the cross-sectional view, the grooves 24*c* and 24*d* may be formed in a specific shape such as a V shape.

In the embodiment, the fail-safe spring 20 is formed using a stainless steel material. When using the metal material, it is easy to perform a press process, and it is easy for the elastic mount portion 22 or the short-circuit portion 24 to be formed in a specific shape. Also, it is easy to process the recess 26.

As described above, since the fail-safe spring 20 is elastically mounted on the body of the 3-electrode surge protective device 10, any materials having necessary elasticity other than the stainless steel material may be used. The short-circuit portion 24 operates to electrically connect the earth electrode 12 to the line electrodes 16*a* and 16*b*. Accordingly, a conductive material is used as a raw material of the fail-safe spring 20. The material is selected in consideration of weather resistance, and coating for corrosion resistance may be performed as necessary.

(Operation of 3-Electrode Surge Protective Device)

The 3-electrode surge protective device 10 shown in FIG. 1 is assembled as follows: the solder chip 30 is housed in the recess 26 of the fail-safe spring 20, the lead pin 18*a* is inserted into the hole 28, and the elastic mount portion 22 is fitted to the outer face of the surge protective device body 10*a* while opening the elastic mount portion 22 in the direction which separates both ends of the elastic mount portion 22.

As shown in FIG. 3, the fail-safe spring 20 is mounted such that the solder chip 30 is in contact with the outer face (part where the earth electrode 12 is provided) of the body and the protrusion 21 provided on the elastic mount portion 22 is in contact with the outer face of the earth electrode 12.

Figure 6B:
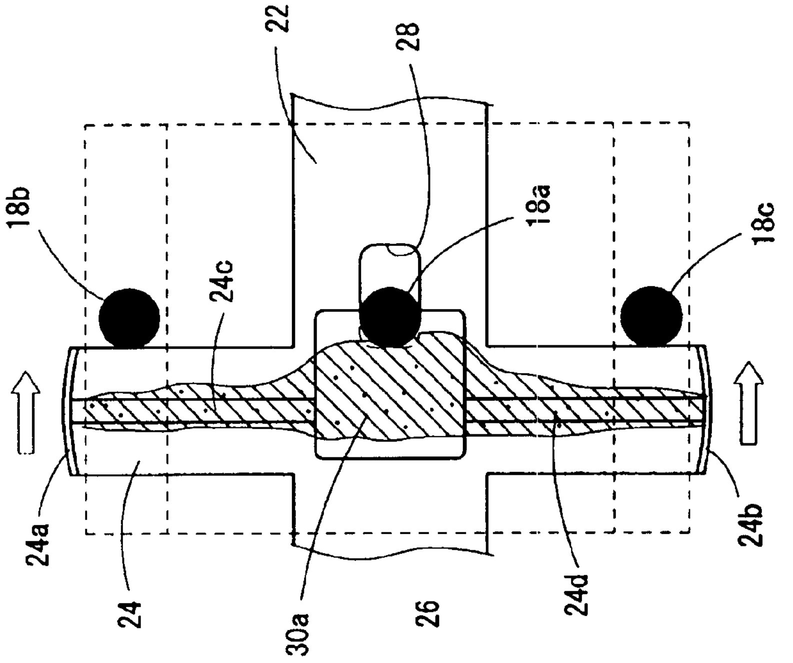
FIGS. 6A and 6B are diagrams illustrating a positional relation of the fail-safe spring and lead pins before and after a solder chip has melted.
Figure 6A:
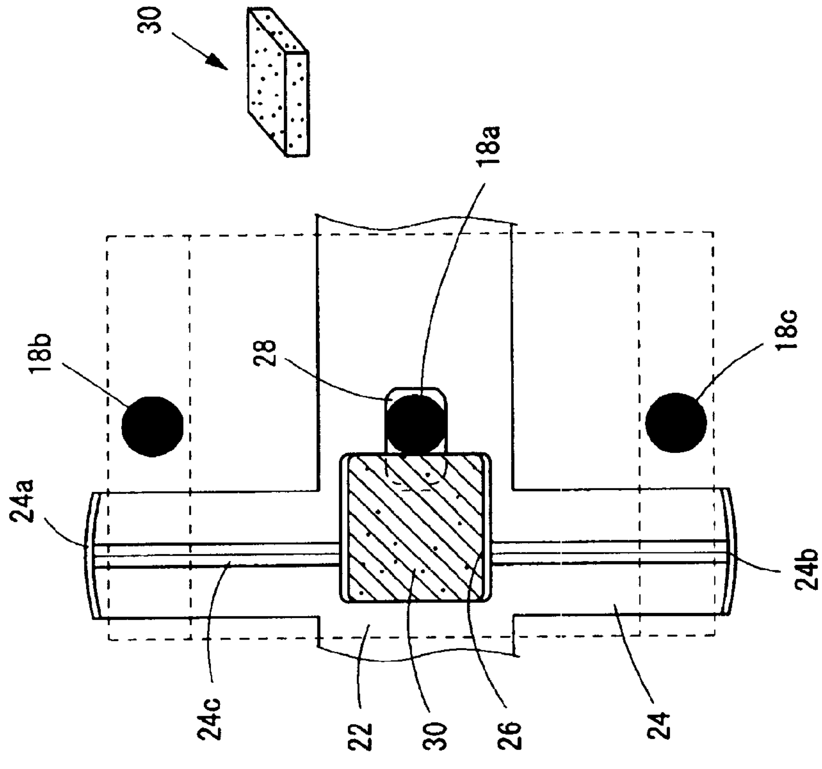

FIG. 6A shows a state where the fail-safe spring 20 and the solder chip 30 are mounted on the surge protective device body 10*a*, when viewed from the lower side where the lead pins 18*a*, 18*b*, and 18*c* are provided.

When the solder chip 30 is housed in the recess 26 and the lead pin 18*a* is inserted into the hole 28, the position of the lead pin 18*a* is restricted within the hole 28 by the side face of the solder chip 30. That is, the lead pin 18*a* is restricted to be positioned on the outside of the recess 26 in the hole 28 by the solder chip 30. Accordingly, the short-circuit portion 24 of the fail-safe spring 20 is supported at the separation position separated from the lead pins 18*b* and 18*c*. In other words, the positions and shapes of the recess 26 of the fail-safe spring 20 and the solder chip 30 are set to be at the separation positions in which the lead pins 18*a*, 18*b*, and 18*c* are not in contact with the short-circuit portion 24 in the state where the solder chip 30 is housed in the recess 26.

FIG. 6A shows a mounting state of the fail-safe spring 20 in a normal situation. In a normal situation, the fail-safe spring 20 is electrically connected to the earth electrode 12 and the lead pin 18*a* through the solder chip 30 and the protrusion 21. Meanwhile, the short-circuit portion 24 of the fail-safe spring 20 is separated from the outer faces of the line electrodes 16*a* and 16*b*, and is located at the separation position separated from the lead pins 18*b* and 18*c*. Accordingly, the earth electrode 12 is not electrically connected to the line electrodes 16*a* and 16*b*.

FIG. 6B shows a state where a surge current enters the 3-electrode surge protective device 10 and the fail-safe mechanism operates.

When the discharge of the 3-electrode surge protective device 10 continues without stopping and the body of the surge protective device 10 is overheated and the temperature of the body reaches a temperature which melts the solder chip 30, the solder chip 30 housed in the recess 26 is melted and the restriction imposed on the lead pin 18*a* by the solder chip 30 is released. Thus, the lead pin 18*a* moves into the hole 28 and enters the recess 26. That is, the short-circuit portion 24 moves toward the lead pins 18*b* and 18*c* by the elastic force of the fail-safe spring 20. In FIG. 6B, the moving direction of the short-circuit portion 24 is represented by arrows when the solder chip 30 has melted. The side edges of the short-circuit portion 24 move to a contact position coming into contact with the outer faces of the lead pins 18*b* and 18*c*, the lead pins 18*a*, 18*b*, and 18*c* are electrically connected to each other through the short-circuit portion 24, and the earth electrode 12 and the line electrodes 16*a* and 16*b* are electrically short-circuited.

The elastic force of the fail-safe spring 20 constantly operates in a direction of pressing the solder chip 30 toward the outer face of the surge protective device body 10*a*. In other words, the elastic force operates in a direction of allowing the fail-safe spring 20 to move toward the outer face of the surge protective device body 10*a*. Accordingly, when the solder chip 30 has melted, the elastic mount portion 22 and the short-circuit portion 24 of the fail-safe spring 20 move to be compressed (reduction of diameter) toward the outer face of the body of the 3-electrode surge protective device 10.

At this time, the molten solder chip 30*a* formed by the melting of the solder chip 30 housed in the recess 26 is compressed between the inner face of the fail-safe spring 20 and the outer face of the surge protective device body 10*a*, and spreads out between the inner face of the fail-safe spring 20 and the outer face of the surge protective device body 10*a*.

FIG. 6B shows a state where the molten solder chip 30*a* has spread out. First of all, the molten solder chip 30*a* spreads out in the vicinity of the recess 26, but a part of the molten solder chip 30*a* is guided toward the grooves 24*c* and 24*d* of the short-circuit portion 24 so as to spread out toward the end portions of the short-circuit portion 24. The short-circuit portion 24 is compressed toward (pressed in contact with) the outer face of the surge protective device body 10*a*, the inner face of the short-circuit portion 24 comes into contact with the outer face of the earth electrode 12 and the outer faces of the line electrode 16*a* and 16*b*, and the earth electrode 12 and the line electrodes 16*a* and 16*b* are electrically short-circuited to each other through the short-circuit portion 24. Since the molten solder chip 30*a* spreads out so as to fill a gap between the inner face of the short-circuit portion 24 and the outer face of the surge protective device body 10*a*, the short-circuit portion 24, the earth electrode 12, and the line electrodes 16*a* and 16*b* are surely electrically connected in close contact through the molten solder chip 30*a*.

In the embodiment, the inner face of the short-circuit portion 24 is formed of the curved face according to the curved face of the outer face of the surge protective device body 10*a*. Accordingly, when the diameter of the fail-safe spring 20 is reduced toward the outer face of the surge protective device body 10*a*, the inner face of the short-circuit portion 24 comes into contact with the outer face of the surge protective device body 10*a* according to the outer face of the surge protective device body 10*a* and it is possible to surely electrically short-circuit the earth electrode 12 and the line electrodes 16*a* and 16*b* through the short-circuit portion 24.

The bending portions 24*a* and 24*b* provided at both ends of the short-circuit portion 24 comes into contact with the outer peripheries of the line electrodes 16*a* and 16*b* when the diameter of the fail-safe spring 20 is reduced. Accordingly, the electrical connection of the short-circuit portion 24 and the line electrodes 16*a* and 16*b* is further surely secured.

The 3-electrode surge protective device 10 according to the embodiment complexly operates as follows. (1) The short-circuit portion 24 comes into press contact with the lead pins 18*a*, 18*b*, and 18*c*. (2) The short-circuit portion 24 comes into contact with the outer faces of the earth electrode 12 and the line electrodes 16*a* and 16*b*. (3) The molten solder chip 30*a* spreads out between the inner face of the short-circuit portion 24 and the outer face of the surge protective device body 10*a*. (4) The protrusion 21 provided on the elastic mount portion 22 to be close to the lead pins at the lower end comes into contact with the outer face of the earth electrode 12. (5) The bending portions 24*a* and 24*b* provided at both ends of the short-circuit portion 24 come into contact with the line electrodes 16*a* and 16*b*. Accordingly, when the discharge of the 3-electrode surge protective device 10 continues, the earth electrode 12 and the line electrodes 16*a* and 16*b* are electrically short-circuited to stop the discharge of the surge protective device 10.

As described above, according to the fail-safe mechanism of the embodiment, even when the surge currents having different phases enter the line electrodes 16*a* and 16*b* of the 3-electrode surge protective device 10 and are discharged by only one line electrode of the surge protective device 10, the earth electrode 12 and both the line electrodes 16*a* and 16*b* are earthed to stop the discharge of the surge protective device 10. Therefore, it is possible to surely detect which surge protective device is faulty (fail-safe mechanism operates) through the telephone line.

In the embodiment, the solder chip 30 interposed between the fail-safe spring 20 and the surge protective device body 10*a* is used as a conductive material, which is melted when the surge protective device body 10*a* overheats. The conductive material is not limited to the solder, and an appropriate material with conductivity may be used. In the embodiment, the rectangular solder chip 30 is used, but the shape of the conductive material also serving as a spacer interposing between the fail-safe spring 20 and the lightning arresting body 10*a* is not limited to the rectangular shape and a conductive material with an appropriate shape may be used.

[Second Embodiment]

Figure 7:
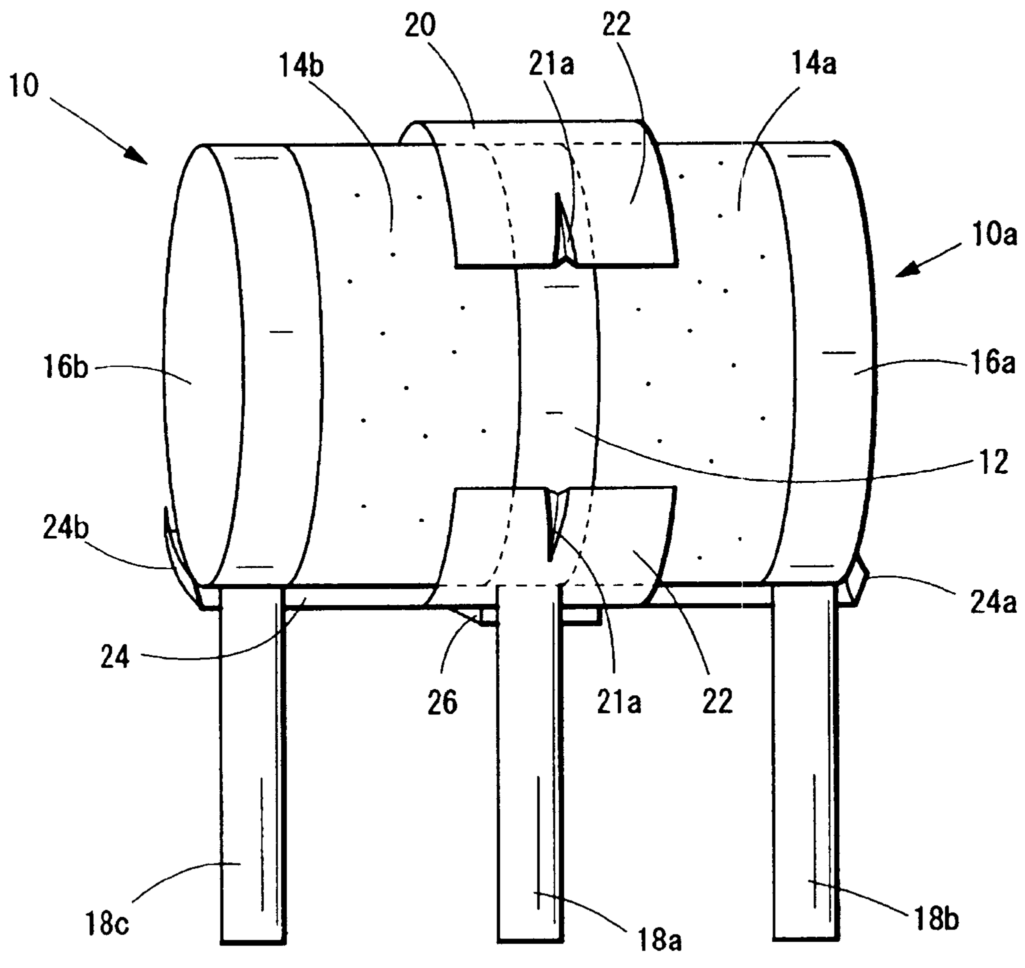
FIG. 7 is a perspective view of a 3-electrode surge protective device according to a second embodiment of the invention.
Figure 8:
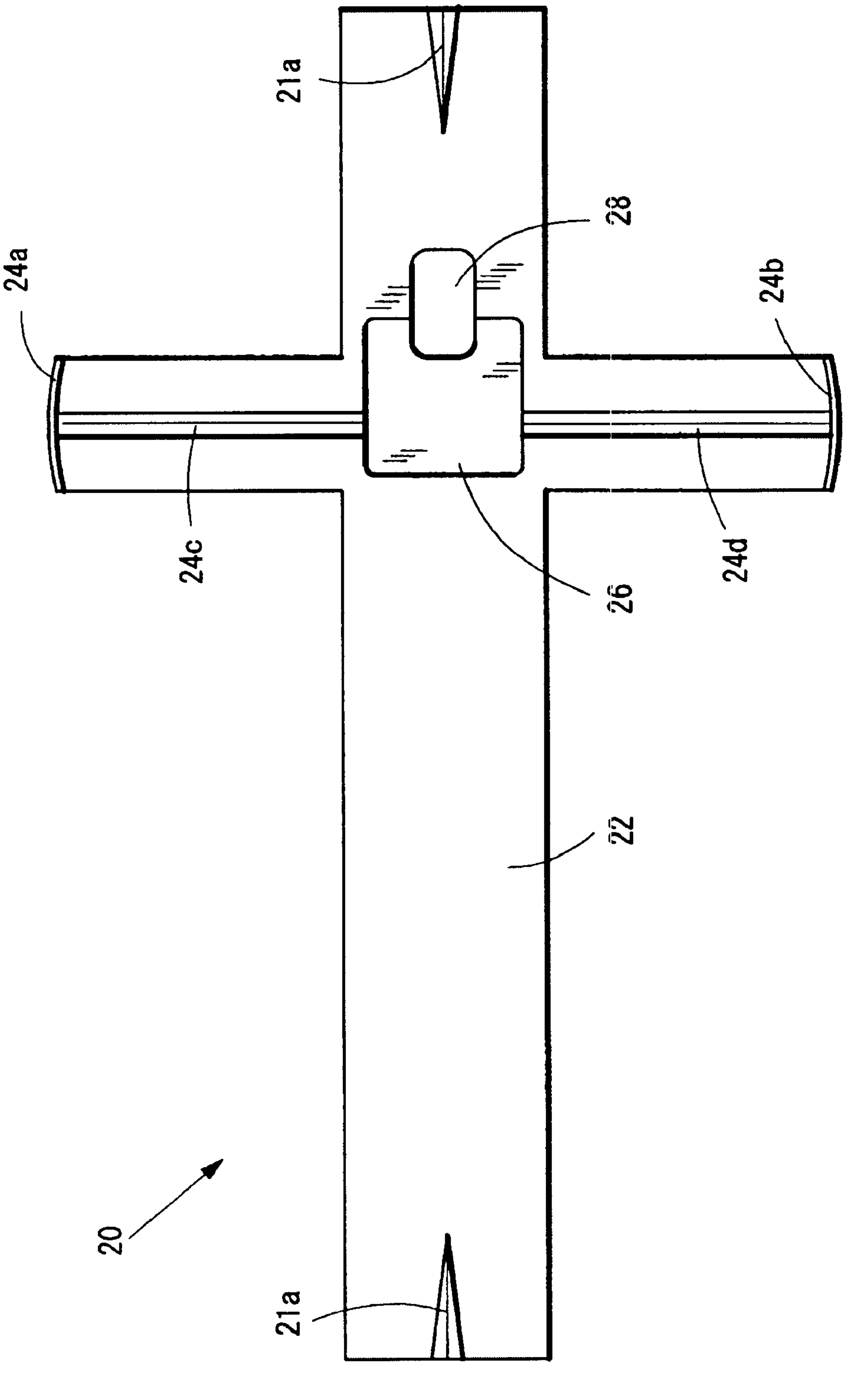
FIG. 8 is a development view of a fail-safe spring according to the second embodiment.

FIG. 7 is a perspective view illustrating a 3-electrode surge protective device 10 provided with a fail-safe mechanism according to a second embodiment, and FIG. 8 is a development view of a fail-safe spring 20 provided on a surge protective device body 10*a*. The fail-safe mechanism according to the embodiment is assembled in the same manner as the fail-safe mechanism described in the first embodiment. Thus, the fail-safe spring 20 is provided with the elastic mount portion 22 and the short-circuit portion 24, and the fail-safe spring 20 is elastically mounted on the surge protective device body 10*a* through the solder chip 30.

The second embodiment is different from the first embodiment in that cross-sectional V-shaped protrusions 21*a*, which extends from the front end edges of the elastic mount portion 22 toward the inside in the longitudinal direction of the elastic mount portion 22, are formed instead of the semispherical protrusions 21 provided at both ends of the elastic mount portion 22 in the first embodiment.

The elastic mount portion 22 with the protrusions 21 and 21*a* is provided to secure electrical connection between the earth electrode 12 and the elastic mount portion 22, and also to secure the operation of reducing the diameter of the elastic mount portion 22 when the solder chip 30 has melted, by bringing the protrusions 21 and 21*a* into contact with the outer peripheral face of the earth electrode 12.

When the face of the elastic mount portion 22 is in contact with the earth electrode 12, friction resistance to the outer face of the earth electrode 12 becomes high when the diameter of the elastic mount portion 22 is reduced, and the reduction of the diameter (movement) of the elastic mount portion 22 may be disturbed. When the elastic mount portion 22 is provided with the protrusions 21 and 21*a*, the contact area between the protrusions 21 and 21*a* and the earth electrode 12 becomes small. Accordingly, the elastic mount portion 22 easily moves, and thus it is possible to reduce the diameter of the elastic mount portion 22. As described in the embodiment, when the protrusions 21*a* are formed in the V shape, it is possible to further easily perform the diameter reduction operation of the elastic mount portion 22 as compared with the protrusions 21 formed in the semispherical shape.

The semispherical or the V-shaped protrusions 21 and 21*a* can be easily formed on the elastic mount portion 22 by a pressing process.

(Width of Elastic Mount Portion)

Figure 9:
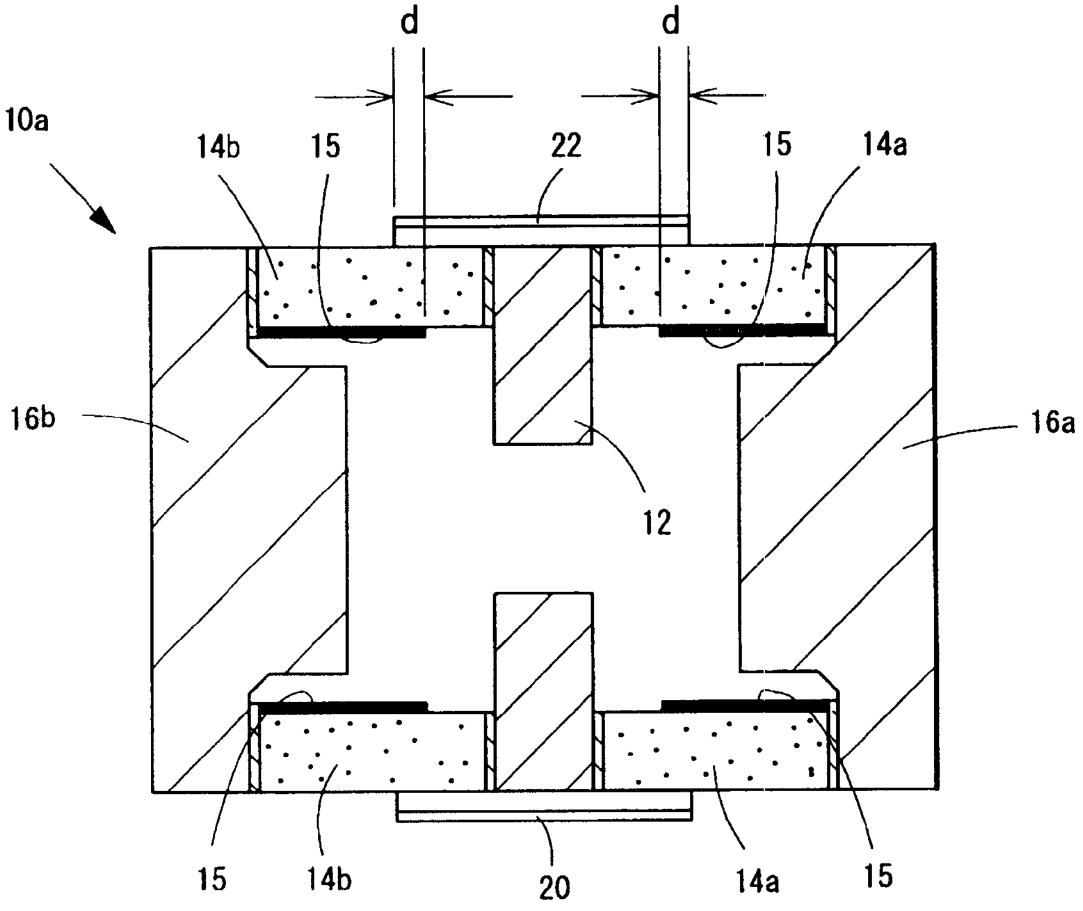
FIG. 9 is a cross-sectional view of an inner structure of the surge protective device and a state where the fail-safe spring is mounted.

FIG. 9 shows a cross-sectional view of the surge protective device body 10*a* of the 3-electrode surge protective device 10. As described above, the surge protective device body 10*a* is assembled by closely soldering the earth electrode 12 and the line electrodes 16*a* and 16*b* onto the end faces of the ceramic cylinders 14*a* and 14*b*. FIG. 9 shows a position of mounting the elastic mount portion 22 of the fail-safe spring 20 mounted on the surge protective device body 10*a*.

Trigger lines 15 are formed on the inner faces of the ceramic cylinders 14*a* and 14*b* in order to stabilize a response operation of discharge of the surge protective device 10. The trigger lines 15 are formed of carbon and extend from the end faces of the ceramic cylinders 14*a* and 14*b*, which are in contact with the line electrodes 16*a* and 16*b*, toward the earth electrode 12, in an axial direction. Also, the trigger lines 15 are formed in a line shape to have a predetermined length. When the ceramic cylinders 14*a* and 14*b* are bonded to the line electrode 16*a* and 16*b*, the end portions of the trigger lines 15 close to the line electrodes 16*a* and 16*b* are connected to metal faces on the line electrodes 16*a* and 16*b*.

A length of the trigger lines 15 is appropriately set to adjust discharge voltage of the surge protective device 10. In the 3-electrode surge protective device according to the embodiment, a width of the elastic mount portion 22 of the fail-safe spring 20 is set so that the trigger lines 15 overlap with the side edge positions of the elastic mount portion 22 in the state where the surge protective device body 10*a* is provided with the fail-safe spring 20. In FIG. 9, a range where the trigger lines 15 overlap with the elastic mount portion 22 is represented by the width d.

Figure 10:
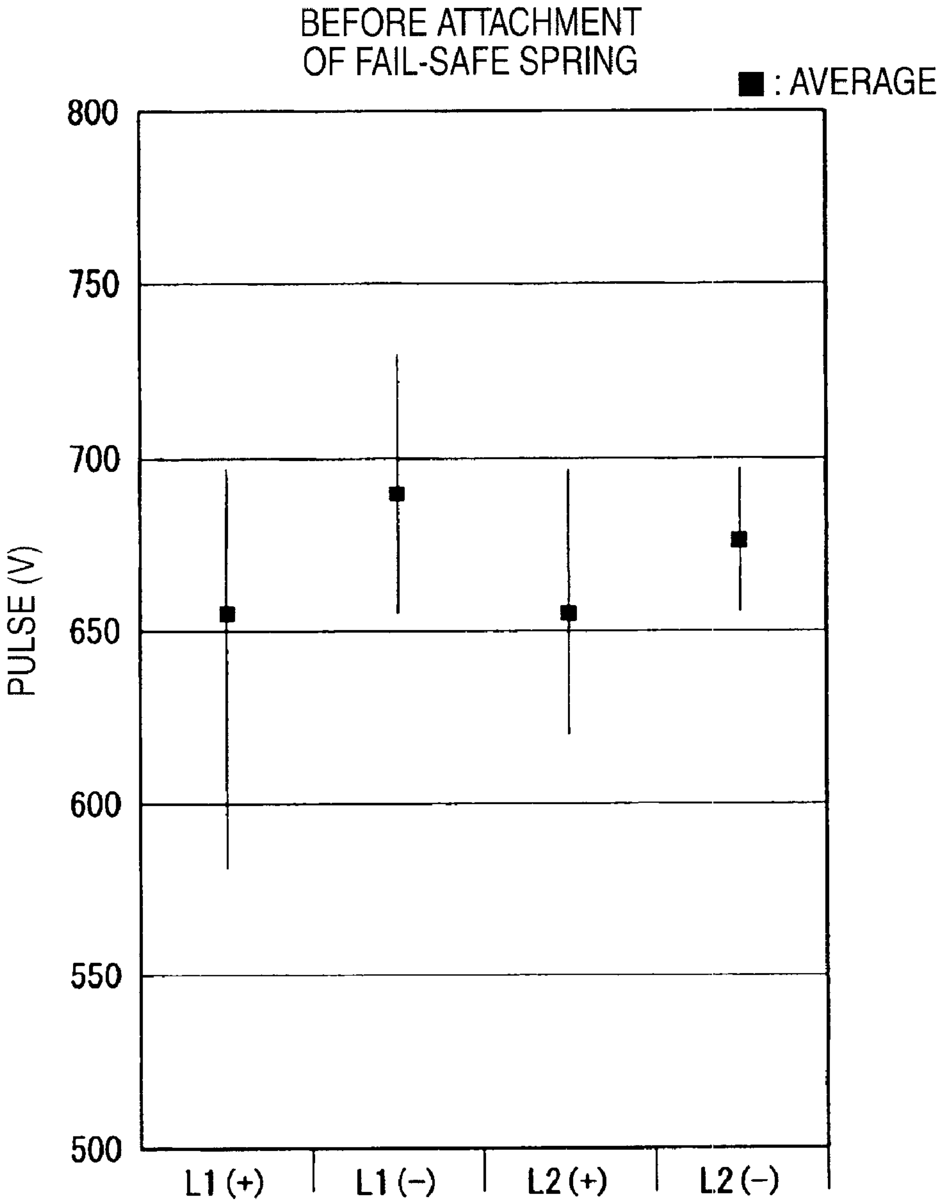
FIG. 10 is a graph illustrating a test result of a discharge characteristic of the surge protective device before the fail-safe spring is mounted.
Figure 11:
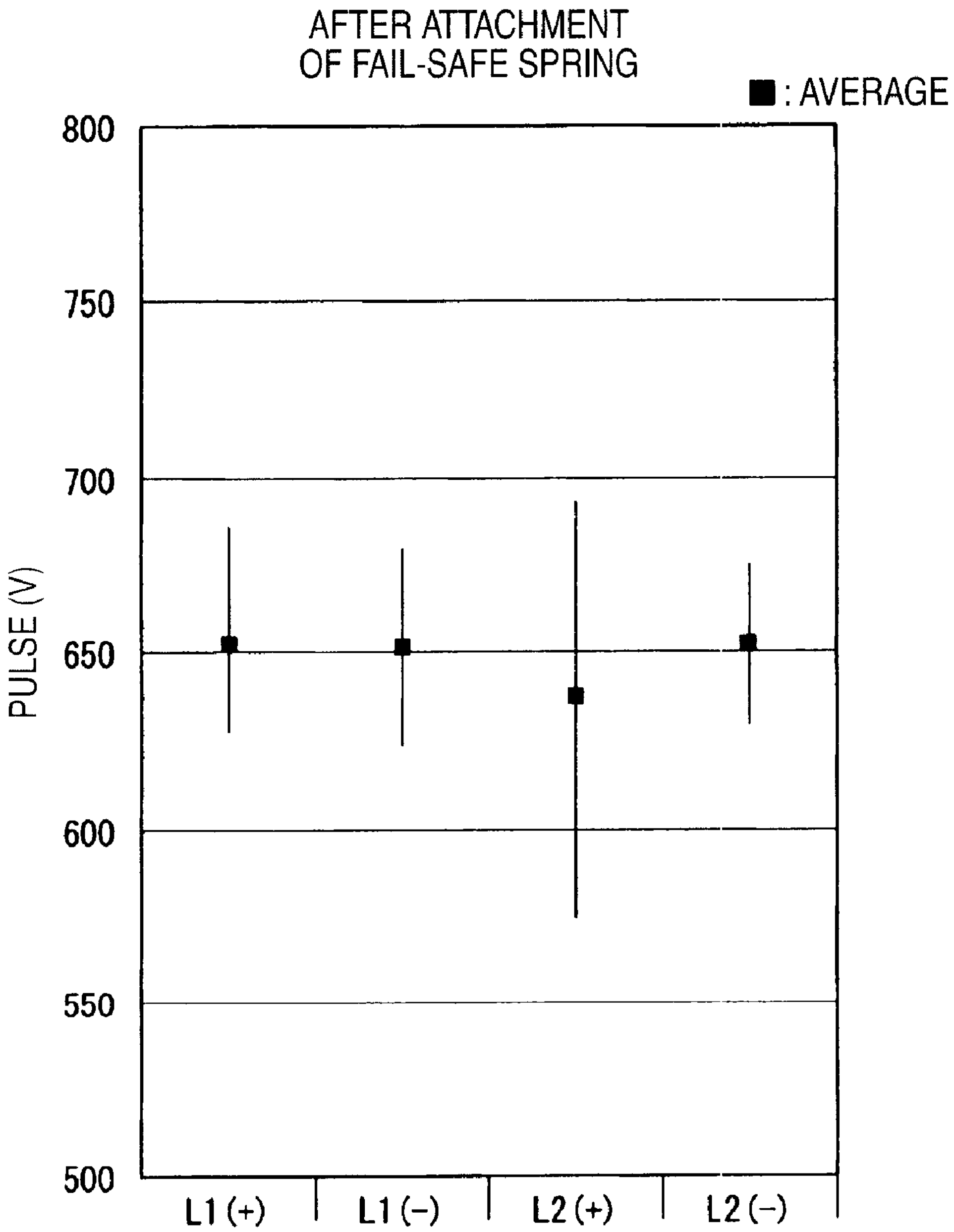
FIG. 11 is a graph illustrating a test result of a discharge characteristic of the surge protective device after the fail-safe spring is mounted.

FIGS. 10 and 11 show test results of a discharge characteristic before and after the surge protective device body 10*a* is provided with the fail-safe spring 20. The discharge characteristics of ten samples were examined. L1(+) and L1(−) are test results in which the discharge characteristic between the line electrode 16*a* through the lead pin 18*b* and the earth electrode 12 through the lead pin 18*a* was examined in two directions, a plus direction (L1(+)) and a minus direction (L1(−)). L2(+) and L2(−) are test results in which the discharge characteristic between the line electrode 16*b* through the lead pin 18*c* and the earth electrode 12 through the lead pin 18*a* was examined in two directions, a plus direction (L2(+)) and a minus direction (L2(−)).

As shown in FIG. 10, before the mounting of the fail-safe spring 20, the discharge voltage on the minus side was higher than the discharge voltage on the plus side, that is, there is a difference in discharge voltage. On the contrary, as shown in FIG. 11, in the state where the fail-safe spring 20 is mounted, for all the line electrodes L1 and L2, the tendency where the discharge voltage on the minus side is higher than the discharge voltage on the plus side is suppressed, the difference in discharge voltage becomes small as a whole, and thus the discharge characteristic of the surge protective device 10 is stable.

The test results show that the fail-safe spring 20 acts on the discharge operation of the surge protective device 10. That is, as shown in FIG. 9, the elastic mount portion 22 overlaps with the trigger lines 15 which are in contact with the line electrodes 16*a* and 16*b*. Accordingly, when the elastic mount portion 22 is charged due to potential differences at the time of starting the discharge, there is an effect that electric charges are early caused on the trigger lines 15 and electron discharge is promoted. Thus, it is possible to improve the response time of the discharge start voltage. Particularly, the discharge start voltage on the L1(+) and L1(−) sides can be decreased to the range of L2(+) and L2(−), and thus the discharge characteristic of the surge protective device can be stabilized.

The 3-electrode surge protective device according to the present invention may be mounted on protective devices of telephone lines, and may be used as a protective component for protecting telephones from surges such as lightning which enters the telephone lines.

According to the 3-electrode surge protective device, when the surge protective device body is overheated, the conductive material is melted and loses its function as the spacer. The short-circuit portion comes into contact with the leads pins, which are provided on both the earth electrode and the line electrodes, and thus the earth electrode and the line electrodes are electrically short-circuited to each other. Therefore, it is possible to stop the discharge of the surge protective device, both of the line electrodes are electrically connected to the earth electrode, and thus it is possible to easily detect the faulty 3-electrode surge protective device.

While the present invention has been shown and described with reference to certain exemplary embodiments thereof, other implementations are within the scope of the claims. It will be understood by those skilled in the art that various changes in form and details may be made therein without departing from the spirit and scope of the invention as defined by the appended claims.

What is claimed is:

1. A 3-electrode surge protective device comprising:

a surge protective device body comprising:
- an earth electrode;
- a ceramic cylinder bonded to the earth electrode; and
- a pair of line electrodes bonded to both side faces of the ceramic cylinder, a fail-safe spring with an electrical conductivity that is mounted on an outer face of the surge protective device body, the fail-safe spring comprising:
- an elastic mount portion provided along an outer peripheral face of the earth electrode to push an outer peripheral face of the surge protective device body, the elastic mount portion including a protrusion projecting from an inner face of the elastic mount portion toward and into contact with the outer peripheral face of the surge protective device body so as to space part of the inner face of the elastic mount portion from the outer peripheral face of the surge protective device body; and
- a short-circuit portion provided to intersect with the elastic mount portion and electrically connecting the earth electrode to the pair of line electrodes, a conductive material that is sandwiched between an inner face of the fail-safe spring and the outer face of the surge protective device body, the conductive material being provided at an intersecting position of the elastic mount portion and the short-circuit portion;

a pair of first lead pins provided on the pair of line electrodes; and a second lead pin provided on the earth electrode, wherein, in a normal state, the conductive material serves as a spacer to support the short-circuit portion at a separation position where the short-circuit portion is separated from the outer peripheral face of the surge protective device body and the first lead pins, and wherein, in case where the surge protective device body is overheated and the conductive material is melted, the short-circuit portion is moved to a contact position where the short-circuit portion comes into contact with the second lead pin and the first lead pins, by a pushing force of the elastic mount portion.

2. The 3-electrode surge protective device according to claim 1, wherein the fail-safe spring further comprises:

bending portions provided at both ends of the short-circuit portion and curved along curved faces of outer edges of the line electrodes.

3. The 3-electrode surge protective device according to claim 1, wherein a portion of the short-circuit portion opposed to the outer face of the surge protective device body is curved along a curved outer face of the surge protective device body.

4. The 3-electrode surge protective device according to claim 1, wherein the protrusion is provided adjacent to a first end of the elastic mount portion, said first end of the elastic mount portion being an end of the elastic mount portion furthest from the second lead pin, and said first end of the elastic mount portion being spaced from the outer peripheral face of the surge protective device body by the protrusion.

5. The 3-electrode surge protective device according to claim 4, further comprising a second protrusion projecting from the inner face of the elastic mount portion toward the outer peripheral face of the surge protective device body, said second protrusion provided adjacent to a second end of the elastic mount portion opposite to the first end of the elastic mount portion.

6. The 3-electrode surge protective device according to claim 5, wherein the protrusion has a semispherical shape and the second protrusion has a semispherical shape.

7. The 3-electrode surge protective device according to claim 5, wherein the protrusion has a cross-sectional V-shape and the second protrusion has a cross-sectional V-shape.

8. The 3-electrode surge protective device according to claim 5, wherein the second protrusion is spaced from the outer peripheral face of the surge protective device.

9. The 3-electrode surge protective device according to claim 4, wherein the protrusion has a semispherical shape.

10. The 3-electrode surge protective device according to claim 4, wherein the protrusion has a cross-sectional V-shape.

11. The 3-electrode surge protective device according to claim 1, wherein the protrusion has a semispherical shape.

12. The 3-electrode surge protective device according to claim 1, wherein the protrusion has a cross-sectional V-shape.

13. A 3-electrode surge protective, comprising:

a surge protective device body comprising:

an earth electrode;

a ceramic cylinder bonded to the earth electrode; and a pair of line electrodes bonded to both side faces of the ceramic cylinder, a fail-safe spring with an electrical conductivity that is mounted on an outer face of the surge protective device body, the fail-safe spring comprising:

an elastic mount portion provided along an outer peripheral face of the earth electrode to push an outer peripheral face of the surge protective device body; and a short-circuit portion provided to intersect with the elastic mount portion and electrically connecting the earth electrode to the pair of line electrodes, a conductive material that is sandwiched between an inner face of the fail-safe spring and the outer face of the surge protective device body, the conductive material being provided at an intersecting position of the elastic mount portion and the short-circuit portion;

a pair of first lead pins provided on the pair of line electrodes; and a second lead pin provided on the earth electrode, the second lead pin inserted into an insertion hole formed through the fail-safe spring near the intersecting position, the insertion hole formed of an elongate hole whose long axis is in a direction where the short-circuit portion is moved between the separation position and the contact position, wherein, in a normal state, the conductive material serves as a spacer to support the short-circuit portion at a separation position where the short-circuit portion is separated from the outer peripheral face of the surge protective device body and the first lead pins, and wherein, in case where the surge protective device body is overheated and the conductive material is melted, the short-circuit portion is moved to a contact position where the short-circuit portion comes into contact with the second lead pin and the first lead pins, by a pushing force of the elastic mount portion.

14. The 3-electrode surge protective device according to claim 13, wherein a recess for housing the conductive material therein is formed at the intersecting position, and wherein the conductive material is housed in the recess while covering a portion of the insertion hole.

15. A 3-electrode surge protective device, comprising:

a surge protective device body comprising:

an earth electrode;

a ceramic cylinder bonded to the earth electrode; and a pair of line electrodes bonded to both side faces of the ceramic cylinder, a fail-safe spring with an electrical conductivity that is mounted on an outer face of the surge protective device body, the fail-safe spring comprising:

an elastic mount portion provided along an outer peripheral face of the earth electrode to push an outer peripheral face of the surge protective device body; and a short-circuit portion provided to intersect with the elastic mount portion and electrically connecting the earth electrode to the pair of line electrodes, a conductive material that is sandwiched between an inner face of the fail-safe spring and the outer face of the surge protective device body, the conductive material being provided at an intersecting position of the elastic mount portion and the short-circuit portion, wherein a recess for housing the conductive material therein is formed in the fail-safe spring at the intersecting position, and a groove is provided on the inner face of the short-circuit portion opposed to the surge protective device body so as to extend from the recess to an end portion of the short-circuit portion, wherein, in a normal state, the conductive material serves as a spacer to support the short-circuit portion at a separation position where the short-circuit portion is separated from the outer peripheral face of the surge protective device body and the first lead pins, and wherein, in case where the surge protective device body is overheated and the conductive material is melted, the short-circuit portion is moved to a contact position where the short-circuit portion comes into contact with the second lead pin and the first lead pins, by a pushing force of the elastic mount portion.

16. A 3-electrode surge protective device, comprising:

a surge protective device body comprising:

an earth electrode;

a ceramic cylinder bonded to the earth electrode; and a pair of line electrodes bonded to both side faces of the ceramic cylinder, a fail-safe spring with an electrical conductivity that is mounted on an outer face of the surge protective device body, the fail-safe spring comprising:

an elastic mount portion provided along an outer peripheral face of the earth electrode to push an outer peripheral face of the surge protective device body; and a short-circuit portion provided to intersect with the elastic mount portion and electrically connecting the earth electrode to the pair of line electrodes, a conductive material that is sandwiched between an inner face of the fail-safe spring and the outer face of the surge protective device body, the conductive material being provided at an intersecting position of the elastic mount portion and the short-circuit portion;

a pair of first lead pins provided on the pair of line electrodes;

a second lead pin provided on the earth electrode; and carbon trigger lines provided on the inner face of the ceramic cylinder so as to overlap with the elastic mount portion when viewed from a top, wherein, in a normal state, the conductive material serves as a spacer to support the short-circuit portion at a separation position where the short-circuit portion is separated from the outer peripheral face of the surge protective device body and the first lead pins, and wherein, in case where the surge protective device body is overheated and the conductive material is melted, the short-circuit portion is moved to a contact position where the short-circuit portion comes into contact with the second lead pin and the first lead pins, by a pushing force of the elastic mount portion.

* * * * *